United States Patent [19]

Sokkappa

[11] Patent Number: 5,265,023
[45] Date of Patent: Nov. 23, 1993

[54] METHOD FOR ISSUING ADAPTIVE GROUND DELAYS TO AIR TRAFFIC

[75] Inventor: Balraj G. Sokkappa, Vienna, Va.

[73] Assignee: Mitre Corporation, Bedford, Mass.

[21] Appl. No.: 559,204

[22] Filed: Jul. 27, 1990

[51] Int. Cl.$^5$ ............................................. G06F 15/48
[52] U.S. Cl. ................................... 364/439; 364/436
[58] Field of Search ........... 364/439, 436, 513, 424.01, 364/424.02, 443

[56] References Cited

U.S. PATENT DOCUMENTS

| | | | |
|---|---|---|---|
| 4,706,198 | 11/1987 | Thurman | 364/439 |
| 4,827,418 | 5/1989 | Gestenfeld | 364/439 |
| 4,827,419 | 5/1989 | Selby, III | 364/443 |
| 4,924,386 | 5/1990 | Freedman et al. | 364/402 |
| 4,926,343 | 5/1990 | Tsuruta et al. | 364/513 |
| 4,979,118 | 12/1990 | Kheradpir | 364/436 |
| 5,053,970 | 10/1991 | Kurihara et al. | 364/401 X |

OTHER PUBLICATIONS

Brazile et al., "Gates An Airline Gate Assignment and Tracking Expert System, "IEEE Expert, pp. 33–39, Summer 1988.

Primary Examiner—Parshotam S. Lall
Attorney, Agent, or Firm—Choate, Hall & Stewart

[57] ABSTRACT

A closed feedback system for issuing ground delays in air traffic control is disclosed, whereby the demand of arriving air traffic is constantly monitored and the ground delays are adjusted in real time to account for the demand that has not materialized. The departure messages from air traffic control centers are continuously monitored to determine if flights are departing on time. If a flight does not depart within a specified time interval, it is considered cancelled or delayed due to company reasons and the arrival slot is assigned to a flight that can use that slot. The slot vacated by the reassigned flight is assigned to another flight and so forth until all slots are filled. Provision is made for airlines to inform air traffic control of company delays and cancellations so that departure times can be assigned that the flight can meet. This scheme significantly improves the efficiency of operation and reduces the possibility of flights being given ground delays when the capacity at the airport is not fully utilized.

8 Claims, 9 Drawing Sheets

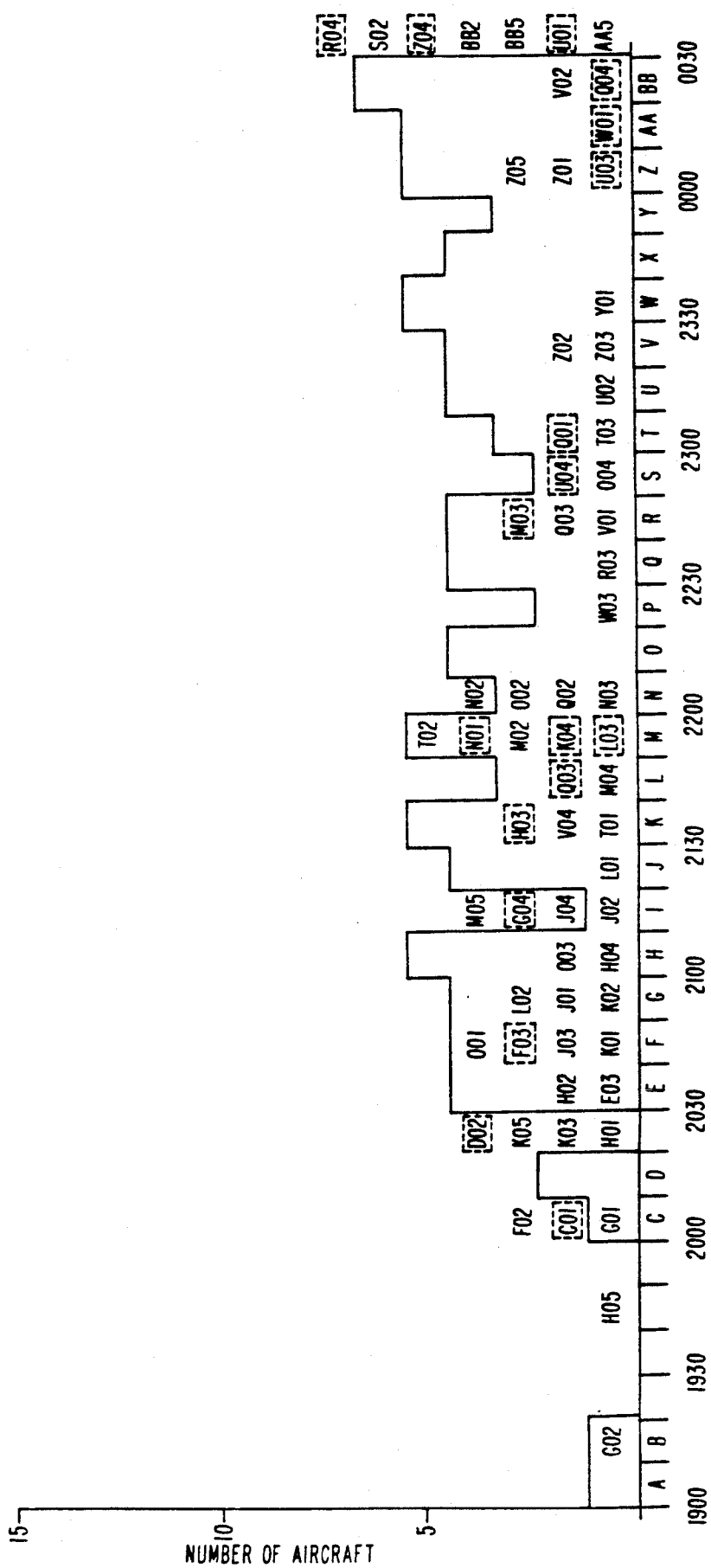

METHOD FOR ISSUING ADAPTIVE GROUND DELAYS TO AIR TRAFFIC

BACKGROUND ART

This invention concerns methods of traffic flow management in air traffic control, more particularly, a method for issuing ground delays to flights during air traffic congestion.

The capacity of the major airports to handle arrival flights safely is the major factor that limits the flow of air traffic today in the continental U.S.A. This capacity is fundamentally determined by the available runways and the separation standards imposed between aircraft close to the runway. When the demand on the airport exceeds the capacity for a sustained period of time, arrival aircraft have to be delayed either in the air or on the ground. If delays are unavoidable, it is better to absorb them on the ground due to safety and fuel cost considerations.

The Central Flow Control Facility (CFCF) of the Federal Aviation Administration (FAA) monitors the predicted capacity of the major airports based on weather, maintenance, runway closures, etc., against the anticipated arrival traffic as reflected in the airline schedule, the filed flight plans, and other historic traffic data. This comparison is made everyday usually several hours in advance. If large delays are predicted due to an imbalance between the demand and the anticipated capacity, ground delays are issued to smooth the peaks in demand. The earliest time, after ground delay, at which the aircraft can be cleared for take-off by Air Traffic Control (ATC) is known as the Expected Departure Clearance Time (EDCT). Certain automation aids are available today to the traffic management specialists at the CFCF to make the comparison and issue ground delays.

Uncertainties in the capacity and the demand are inherent to the prediction process. A major factor in the prediction of capacity is the uncertainty associated with the prediction of weather. The demand as reflected in the schedules and flights plans are also unreliable until the flights actually materialize. There may also be unanticipated general aviation, military, and chartered flights. Further, the very process of issuing large ground delays creates uncertainty in the demand, since the flights may cancel or divert to another airport, or may not be able to leave on time because they were delayed elsewhere. The result can be a grossly inefficient utilization of airspace resources; that is, flights can be delayed when the available airport capacity is not being fully utilized.

The present method of issuing ground delays does not make use of dynamic information on flight status. It is based on the assumption that the demand predicted several hours earlier is correct and that the flights will depart according to the assigned departure times. At present, the traffic management specialists have to manually monitor the status of the flights and reissue ground delays as necessary. Hence, it is very difficult to respond effectively to dynamic information that is now available.

SUMMARY OF THE INVENTION

The present invention is a closed-loop system whereby ground delays are automatically updated in response to cancellations or company delays. The departure messages from the air traffic control centers are continuously monitored to determine whether the flights depart according to the assigned departure times. If a flight does not depart within a specified time interval, it is considered cancelled or delayed due to company reasons and the corresponding arrival slot is assigned to a flight that can use that slot. The slot vacated by the reassigned flight is assigned to another flight and so forth until all slots are filled. Provision is made for airlines to inform air traffic controllers of company delays so that departure times can be assigned that the flight can meet. This scheme significantly improves the efficiency of operation and, hence, the delays by reducing the possibility of flights being given ground delays when the capacity at the airport is not fully utilized.

In order to demonstrate the benefits of the present invention, twenty-two actual cases in which large ground delays were assigned by the CFCF were selected at random for analysis. In all cases the utilization of the arrival airport capacity was much less than that planned in the ground delay assignment. In the 22 cases, as much as 31 percent of the flights that were assigned ground delays did not materialize. As much as 55 percent of the flights with ground delays were unable to depart at the assigned EDCTs. During the congested arrival time for which ground delays were issued, the utilization of the airport was as low as 17 percent and as high as 96 percent of what was planned. In most cases the utilization was about 85 percent of the planned utilization.

The analysis showed that if the cancellations are known no later than the assigned EDCT, an adaptive ground delay logic could reduce the average ground delay by 13 percent to 70 percent for those flights that were able to depart at the EDCT. The result is, of course, dependent on the number of cancellations and company delayed flights. In actual practice this benefit would be somewhat less due to lack of definitive information on these flights. Nevertheless, considerably more efficient utilization of the arrival capacity and reduction in the assigned ground delay seems possible with an adaptive ground delay logic.

BRIEF DESCRIPTION OF THE DRAWING

In the drawing:

FIG. 8b shows the actual arrivals for the day.

DESCRIPTION OF THE PREFERRED EMBODIMENT

Figure 1:
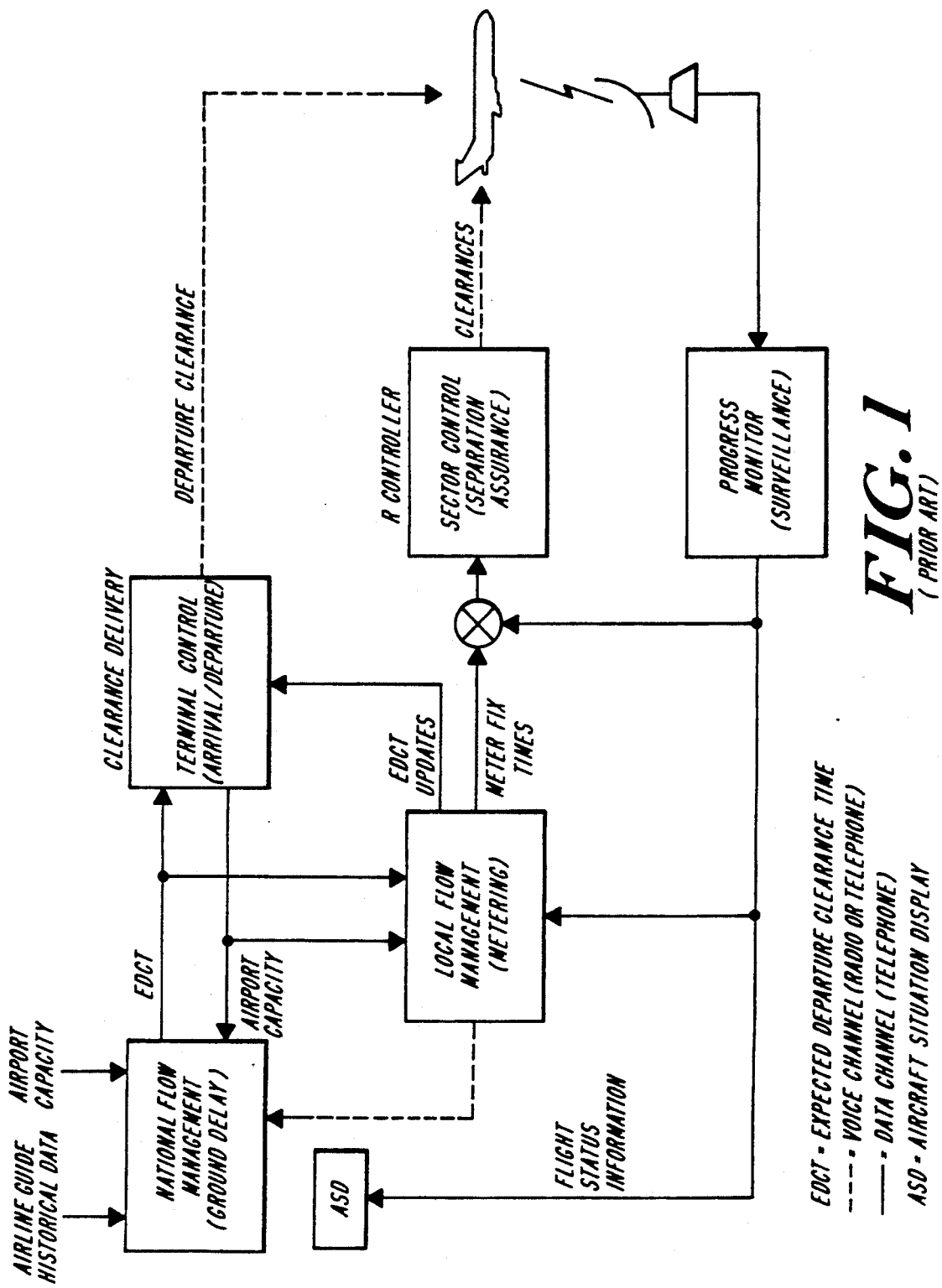
FIG. 1 is a schematic diagram of the present ground delay assignment system.

Whenever the demand on an airport exceeds its capacity for any significant length of time, the flights have to absorb unavoidable delays. The present Air Traffic Control (ATC) system is designed to absorb these delays at two levels. As shown in FIG. 1, the local flow management performs the metering function which computes any necessary airborne delays and informs the en route controllers who issue clearances to flights to absorb the delays. At the national flow management level, the CFCF issues ground delays, if large delays are anticipated. These ground delays are issued to terminal control towers at the departure airport in the form of Expected Departure Clearance Times (EDCT). The controllers at the towers issue departure clearance to the aircraft, consistent with the EDCT issued by the CFCF.

The CFCF has recently established a national database of flight status. The radar-track positions of flights as well as departure and arrival messages are sent periodically from every ATC center to maintain this database. The positions of the aircraft are displayed to the traffic management specialists at the CFCF on an Aircraft Situation Display (ASD). However, the system operates as an open loop manual control system, since the ASD does not include any automation to monitor or update the ground delays issued by the CFCF.

Figure 2:
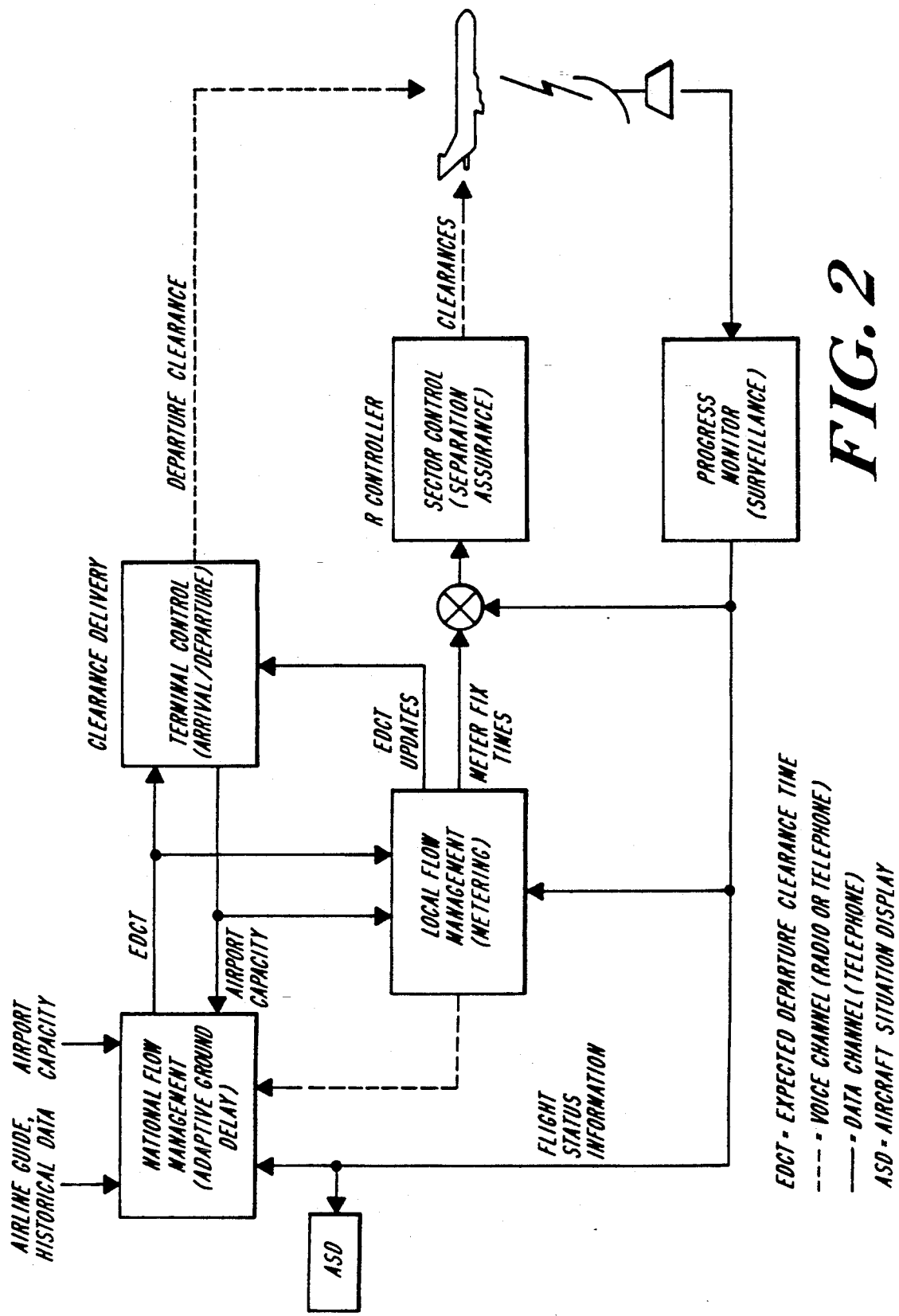
FIG. 2 is a schematic diagram of the adaptive ground delay assignment method of the present invention.

The present invention closes the loop that now ends at the ASD. As shown in FIG. 2, flight status information does not end at the ASD, but is fed back to the CFCF computers so that the ground delays (EDCTs) can be automatically updated in response to new information on cancellations and company delays. An Adaptive Ground Delay (AGD) algorithm is programmed in the CFCF computers. The programs accept as input data from the flight status database. The output is the revised EDCTs.

Based on the airport capacity specified by the controller, a capacity profile is generated. A capacity profile is a list of times and airport capacities such that capacity will be in effect starting at time1, capacity2 will be in effect at time2, etc. From this profile a template Alist list with arrival times (Atimes) to match the specified capacity is constructed. At any time, the capacity profile can be changed by the controller by an input. If this occurs, the entire Alist will be reconstructed. In generating the initial EDCT list, aircraft are assigned to these Atimes slots on a first-come first-served (or any other specified) rule. The appropriate EDCT times (Ctimes) are calculated as follows:

$$Ctime = Atime - ETE$$

where ETE is the estimated time en route and is the difference between the arrival time and the departure time in the trajectory.

The present invention reassigns aircraft to different arrival slots (Atimes) in the Alist, when earlier slots become available. Slots can become available when a flight is cancelled or incurs a delay which makes the assigned arrival time impossible to meet. The effectiveness of the present invention in reducing system ground delay is dependent on the efficient use of available slots by reassignment according to the AGD algorithm. Some of the logic described here may be subject to change from economic and political considerations. A consensus has to be reached between the ATC specialists and the airspace users as to the most equitable way of reassigning the slots.

The present invention monitors messages that may be received from the flight operators on cancellations and company delays. It also monitors the actual departure message on each flight. If a cancellation or company delay message is received or if a flight does not materialize within a specified interval from its EDCT, the arrival slot (Atime) is reassigned to another flight by the AGD algorithm.

Figure 3:
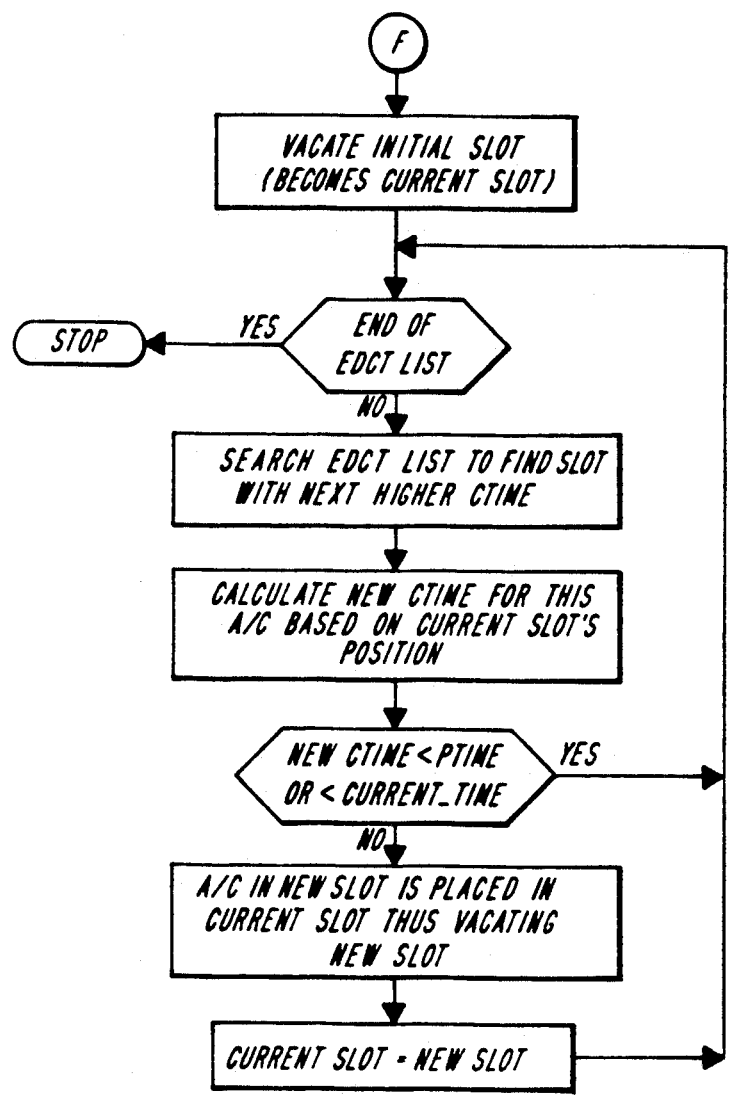
FIG. 3 is a flow chart of the logic for filling empty slots in the EDCT list.

Flights are available for reassignment by the AGD algorithm if they are not frozen. Flights are considered "frozen" in the EDCT list when they have departed or when their Atimes are within one hour of the current time, thus bringing them under the control of the regional metering function. Flights are also frozen when their Ctime is sufficiently close to the current time because it is not practical to change the departure time when the aircraft has been told to push back from the terminal or is taxiing to the runway. The AGD algorithm is data driven and the aircraft are reassigned according to the following rules:

1. When a slot becomes vacant through a cancellation, the EDCT list is searched according to increasing Ctimes for a candidate eligible to fill the slot. Once found, the candidate is assigned the vacant slot thus creating another available slot. The process continues until no further flight can be moved into an earlier slot. If the new Ctime for a candidate flight is before its Ptime (proposed time of departure) or the current clock time, the flight is not eligible to be moved. This logic is shown in FIG. 3 where "a/c" represents "aircraft".

2. When a pilot indicates his flight will incur extra delay (company delay), the AGD algorithm calculates a new Ptime. If the pilot calls before his Ptime, his new Ptime is calculated as:

$$new\text{--}Ptime = old\text{--}Ptime + extra\text{--}delay.$$

If the pilot calls after his original Ptime, his new Ptime is calculated:

$$new\text{--}Ptime = current\text{--}time + extra\text{--}delay.$$

If the new Ptime falls after his currently assigned Ctime, the aircraft's current arrival slot will be vacated and filled as in 1. The flight will then be peremptorily reassigned a new Atime using this new Ptime. Since ATC delay is the difference between assigned Ctime and Ptime, this process gives the pilot credit for informing the ATC system of the company delay and reduces the ATC delay by that amount. There is an incentive not to wait to report the company delay since if a flight reports and a controller enters company delay after being placed on the wait list as described in 5., the algorithm will not give credit for company delay or make reassignment. Further, should the pilot only wait until he is actually assigned a Ctime before reporting company delay, the controller need not enter it. In this case, not only would the flight not get credit for the company delay, but it would almost certainly not be able to meet its assigned departure time thus incurring system penalties as described in 5.

3. Given a new Atime for a flight, peremptory reassignment will place the aircraft in the appropriate slot even if it is currently occupied. If this happens, the flights at that and all later Atimes will be moved back on the list (i.e., extra delay) to provide space. The movement of flights back on the EDCT list ends when the first empty slot is found. However, in this assignment and movement process, the aircraft that are frozen in the list as defined above will not be moved. This might therefore cause an aircraft to move down several slots if those intervening slots were frozen.

Figure 4:
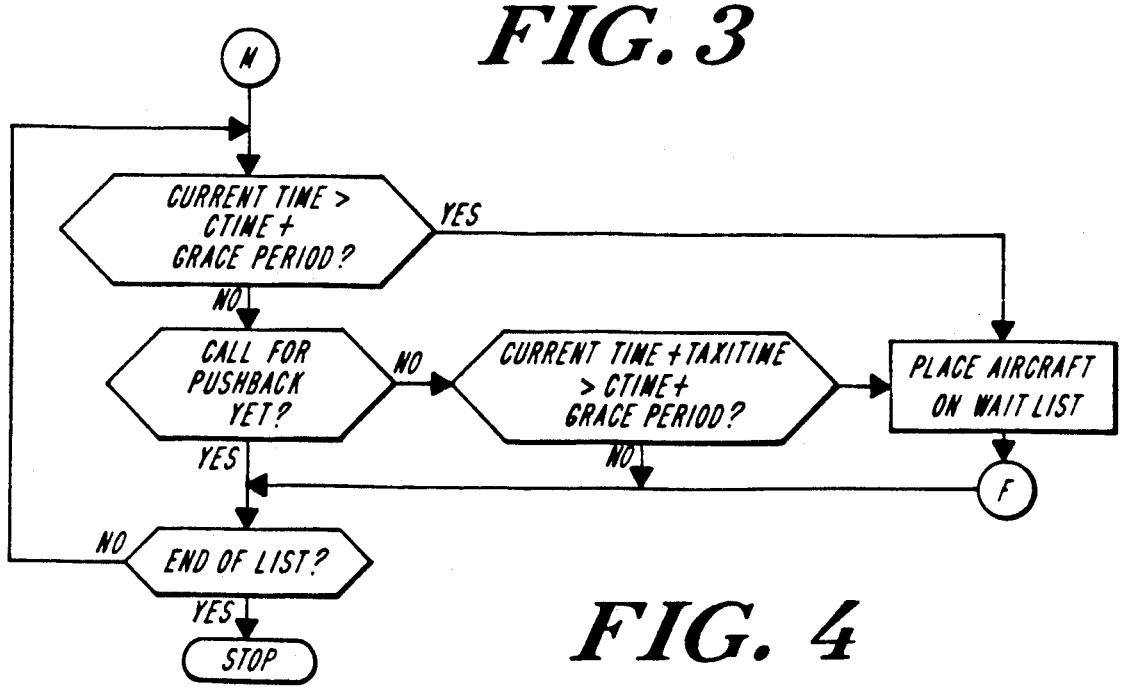
FIG. 4 is a flow chart of the logic for monitoring the EDCT list for missed departures.

4. Aircraft which do not meet their assigned Ctimes will be removed from the EDCT list and placed on a wait list as shown in FIG. 4. The vacated slot will be filled as in 1. Aircraft are considered to have missed their assigned Ctimes in one of two ways:
  a) The current time has advanced beyond the Ctime plus a grace period (parameter) or
  b) the aircraft has not yet called for pushback from the terminal to prepare for takeoff and, based on the current time and the required taxi time, it would not be possible to be airborne by the expiration of the grace period.

Figure 5:
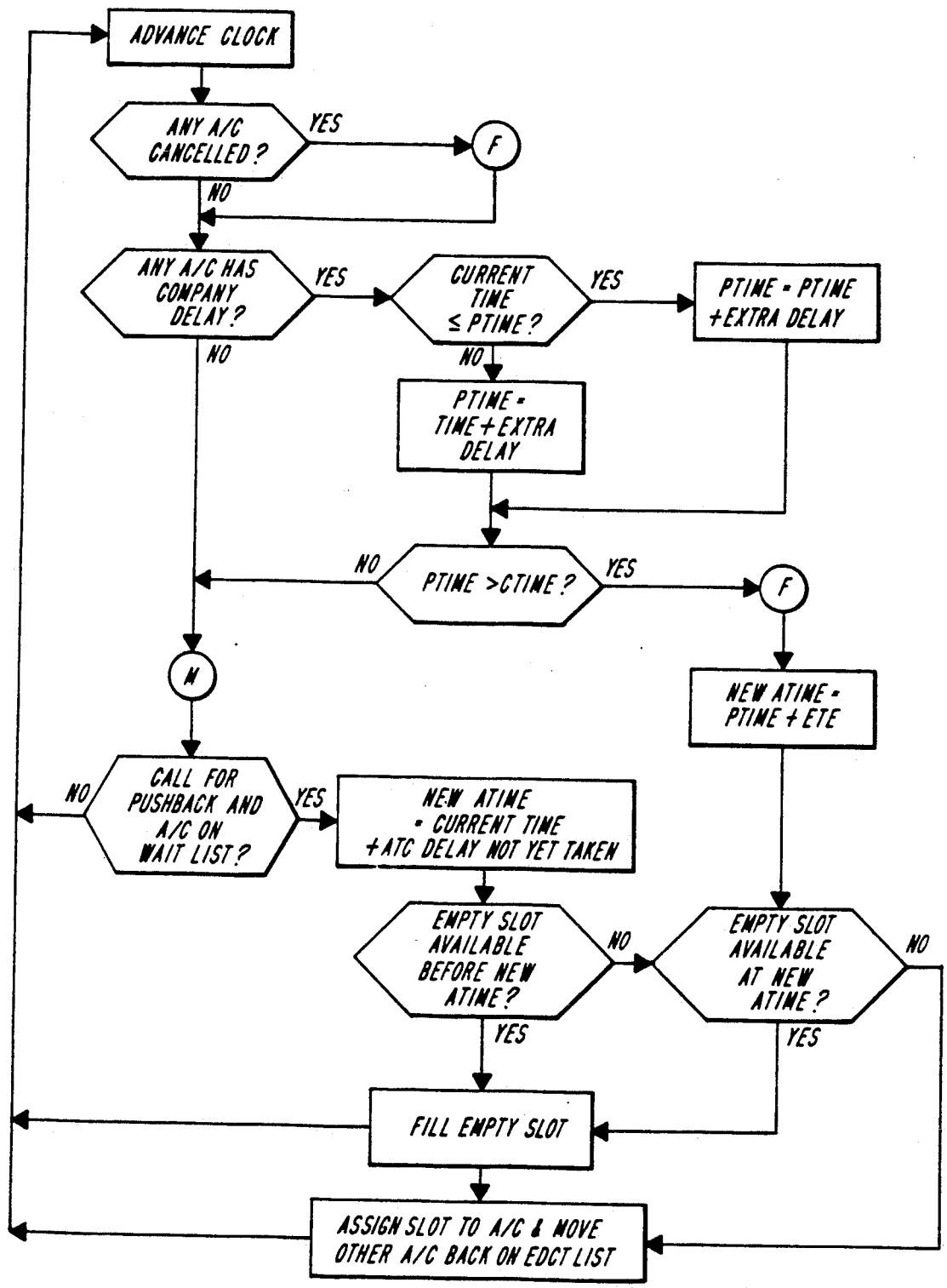
FIG. 5 is a flow chart of the reassignment logic.

5. Once placed on the wait list, the aircraft will remain there until it calls for pushback. At that time, a new Atime will be calculated equal to the sum of the current time and the ATC delay which remained to be taken when the aircraft was placed on the wait list. The aircraft will be peremptorily assigned this new slot as described in 3 unless there is an empty slot between the current time and the new Atime. If so, the flight will be assigned to the empty slot. This exception will prevent unnecessary delay being given to the flights which would otherwise be moved down on the EDCT list. Rules 2, 3, and 5 are depicted in FIG. 5.

During the development of the rules explained above, an attempt was made to be fair to the airlines in the assignment of delay and at the same time have built-in incentives that encourage the early and accurate deliverance of information from the airlines. Obviously the earlier the algorithm receives information on empty slots, the more latitude it has in filling them.

A research project has quantified the efficiency of the present ground delay program and has estimated the potential to reduce the ground delays with the method of the present invention. A fast-time simulation was developed to evaluate the potential improvement in the efficiency of utilization of the airport capacity and the resultant reduction in ground delays when the method of the present invention is implemented. Several sample days and airports, when large ground delays were issued by the CFCF, were arbitrarily chosen for analysis.

The EDCT lists from the CFCF were examined for cases with large delays. Twenty-two cases were picked arbitrarily. These cases involved four different days and twelve different airports. The departure (DZ) messages were examined for the entire day for each case. The arrival (AZ) messages were examined for at least 2 hours earlier and 2 hours later than the start of the arrival periods of the EDCT lists. A flight on the EDCT list that had neither a departure message nor an arrival message was defined as a cancellation. A flight that had a departure time later than a parameter value of 10 minutes was defined as a flight with company delay; that is, a flight that was unable to take off within 10 minutes of its EDCT time for reasons other than ATC. The airframe of a flight that could not take off within 10 minutes of its EDCT could have been delayed by ATC by another EDCT program in effect at the origination airport.

The data used in the study is shown in Table 1. In the cases analyzed, 2 to 56 percent of the flights were cancelled according to the definition of cancellations given above. Six to 53 percent of the flights had company delays; that is, they could not take off until at least 10 minutes after their EDCTs. Further, the number of flights that actually arrived within the arrival time interval involved in the EDCT procedure was as low as 17 percent to as high as 96 percent. While it is true that some of the flights could have been swapped by the airlines, they all should have arrived within the interval unless cancelled if the system operated efficiently. The real performance on these days may have been somewhat better than indicated, because the data may not be entirely complete. However, it is evident that the actual throughput, in most cases, is well below what was planned by the CFCF; that is, the efficiency of utilization of the airport capacity is quite low. The objective of the present invention is an adaptive algorithm for improving the efficiency of capacity utilization.

Description of the Fast-time Simulation

In the real world, the timing and reliability of information from flight operators can be expected to vary widely. It is not practical to analyze all possible outcomes, since there are no statistical data available on the quality of the cancellation and delay information received by ATC from the operators. The fast-time simulation did not attempt to model all the possible variation in the information in the real world.

TABLE 1

|  | Total Number of Flights | Cancelled Flights | Company-Delay Flights | Arrival Inside EDCT Domain | | | Arrivals Outside EDCT Domain | | |
|---|---|---|---|---|---|---|---|---|---|
|  |  |  |  | Regular | Company-Delay | Total | Regular | Delay | Total (%) |
| March 4 | | | | | | | | | |
| CLT | 82 | 7 (9%) | 22 (27%) | 52 | 18 | 70 (85%) | 1 | 4 | 5 (6%) |
| ORD | 786 | 243 (31%) | 324 (41%) | 217 | 285 | 502 (64%) | 2 | 39 | 41 (5%) |
| MDW | 72 | 40 (56%) | 32 (44%) | 0 | 12 | 12 (17%) | 0 | 20 | 20 (28%) |
| STL | 308 | 30 (10%) | 102 (33%) | 175 | 94 | 269 (87%) | 1 | 8 | 9 (3%) |
| JFK | 81 | 20 (25%) | 21 (25%) | 39 | 15 | 54 (67%) | 1 | 6 | 7 (9%) |
| SFO | 145 | 13 (9%) | 31 (21%) | 96 | 22 | 118 (81%) | 5 | 9 | 14 (10%) |
| April 17 | | | | | | | | | |
| SFO | 304 | 33 (11%) | 17 (6%) | 245 | 17 | 262 (86%) | 9 | 0 | 9 (3%) |
| DEN | 214 | 4 (2%) | 24 (11%) | 185 | 21 | 206 (96%) | 1 | 3 | 4 (2%) |
| June 22 | | | | | | | | | |
| EWR | 454 | 198 (44%) | 118 (26%) | 135 | 116 | 251 (55%) | 3 | 2 | 5 (1%) |
| LGA | 256 | 65 (25%) | 101 (39%) | 90 | 101 | 191 (74%) | 0 | 0 | 0 (0%) |
| CLT | 195 | 31 (16%) | 84 (43%) | 80 | 76 | 156 (80%) | 0 | 8 | 8 (4%) |
| PHL | 89 | 26 (29%) | 47 (53%) | 16 | 39 | 55 (62%) | 0 | 8 | 8 (9%) |
| JFK | 98 | 32 (33%) | 21 (21%) | 43 | 15 | 58 (59%) | 2 | 6 | 8 (8%) |
| August 4 | | | | | | | | | |

TABLE 1-continued

|  | Total Number of Flights | Cancelled Flights | Company-Delay Flights | Arrival Inside EDCT Domain | | | Arrivals Outside EDCT Domain | | |
|---|---|---|---|---|---|---|---|---|---|
|  |  |  |  | Regular | Company-Delay | Total | Regular | Delay | Total (%) |
| SFO | 55 | 4 (7%) | 11 (20%) | 40 | 8 | 48 (87%) | 0 | 3 | 3 (5%) |
| PHL | 211 | 25 (12%) | 115 (55%) | 68 | 110 | 178 (84%) | 3 | 5 | 8 (4%) |
| EWR | 204 | 25 (15%) | 67 (33%) | 105 | 66 | 171 (84%) | 7 | 1 | 8 (4%) |
| ORD | 764 | 73 (10%) | 335 (44%) | 349 | 322 | 671 (88%) | 7 | 13 | 20 (3%) |
| MDW | 90 | 8 (9%) | 35 (39%) | 46 | 31 | 77 (86%) | 1 | 4 | 5 (5%) |
| BOS | 220 | 31 (14%) | 90 (41%) | 96 | 86 | 182 (83%) | 3 | 4 | 7 (3%) |
| JFK | 167 | 27 (16%) | 54 (32%) | 62 | 49 | 111 (66%) | 24 | 5 | 29 (17%) |
| LGA | 201 | 20 (10%) | 88 (44%) | 92 | 86 | 178 (89%) | 1 | 2 | 3 (1.5%) |
| PIT | 58 | 3 (5%) | 12 (21%) | 38 | 10 | 48 (83%) | 5 | 2 | 7 (12%) |

"Regular" flights are flights that were not cancelled nor had company-delay.

The objective of the fast-time simulation was only to get an estimate of the possible improvement in the reduction in ground delay. Therefore, the following assumptions were made for purposes of this analysis:

1. If a flight is cancelled, the information is known to the ATC system at its EDCT time. This is equivalent to the flight informing the ATC system of the cancellation at the clearance time. In practice, this information may come earlier or may never come at all.

2. If a flight is unable to depart within ten minutes of the EDCT time, it is assumed to have a company delay. Further, that delay is assumed to be known to the ATC system accurately. In the simulation, the company delay flights were screened previously and their actual departure time represented by the DZ message was taken to be the earliest time it can depart. In the real world, the operator may not notify that ATC system of any delays or its own; even if he did, they could be unreliable.

The fast-time simulation is initiated with the EDCT list as received from the CFCF. An example of the list is shown in Table 2. This list is ordered by the assigned arrival time of the flights at the destination airport, and the rate of arrival along with flights that had no ground delay (not in the list) should match the capacity of the airport specified by the CFC specialist. The estimated time en route (ETE) is the difference between the EDCT time (Ctime) and the assigned arrival time (Atime). Any time a new departure or arrival time is computed, the equation $$Ctime + ETE = Atime$$

has to be satisfied.

The simulation is event driven, the event being the EDCT time of the flights plus the grace period of ten minutes. At every event, the status of that flight is examined; that is, whether it is a cancellation or a company delayed flight.

TABLE 2

| ACID | DEP | ARR | P TIME | C TIME | A TIME |
|---|---|---|---|---|---|
| PXX4797 | BOS | JFK | P1755 | C1803 | A1908 |
| PXX4848 | PHL | JFK | P1820 | C1833 | A1913 |
| PAA2026 | ORD | JFK | P1745 | C1745 | A2006 |
| PXX4864 | ROC | JFK | P1740 | C1858 | A2018 |
| TWA880 | MSY | JFK | P1624 | C1739 | A2019 |
| PXX4914 | SYR | JFK | P1800 | C1921 | A2031 |
| PXX4784 | DCA | JFK | P1810 | C1929 | A2034 |
| PAA476 | MSY | JFK | P1650 | C1807 | A2036 |
| TWA806 | IAH | JFK | P1603 | C1723 | A2039 |
| PXX4894 | BWI | JFK | P1820 | C1938 | A2043 |
| PAA2072 | RDU | JFK | P1800 | C1919 | A2044 |
| TWA746 | ORD | JFK | P1828 | C1828 | A2046 |
| TWA410 | DCA | JFK | P1830 | C1953 | A2049 |
| TWA804 | ATL | JFK | P1726 | C1853 | A2054 |
| TWA298 | PIT | JFK | P1815 | C1941 | A2056 |
| CMD4823 | BDL | JFK | P1845 | C2008 | A2058 |
| PCA3595 | PHL | JFK | P1855 | C2019 | A2059 |
| PAI1280 | DAY | JFK | P1810 | C1928 | A2101 |
| AAL542 | RDU | JFK | P1815 | C1933 | A2103 |
| UAL640 | ORD | JFK | P1900 | C1900 | A2106 |

ACID - Aircraft Identification
DEP - Departure Airport
ARR - Arrival Airport
P TIME - Proposed Departure Time
C TIME - Controlled Departure Time
A TIME - Assigned Arrival Time If neither, the flight is assumed to have taken off at the EDCT time and removed from the list. If it is a cancellation, it is removed from the list and its assigned arrival time is considered a vacant slot. If it is a company delayed flight, it is moved to a waitlist and its assigned arrival time (Atime) is considered a vacant slot. Further, since the flight was not ready to depart when ATC was ready to clear it, it is considered to have taken no ATC delay so far. It is assumed that all the delay was due to reasons other than ATC. In both cases, the vacant slot is reassigned according to the reassignment logic described below.

Figure 6:
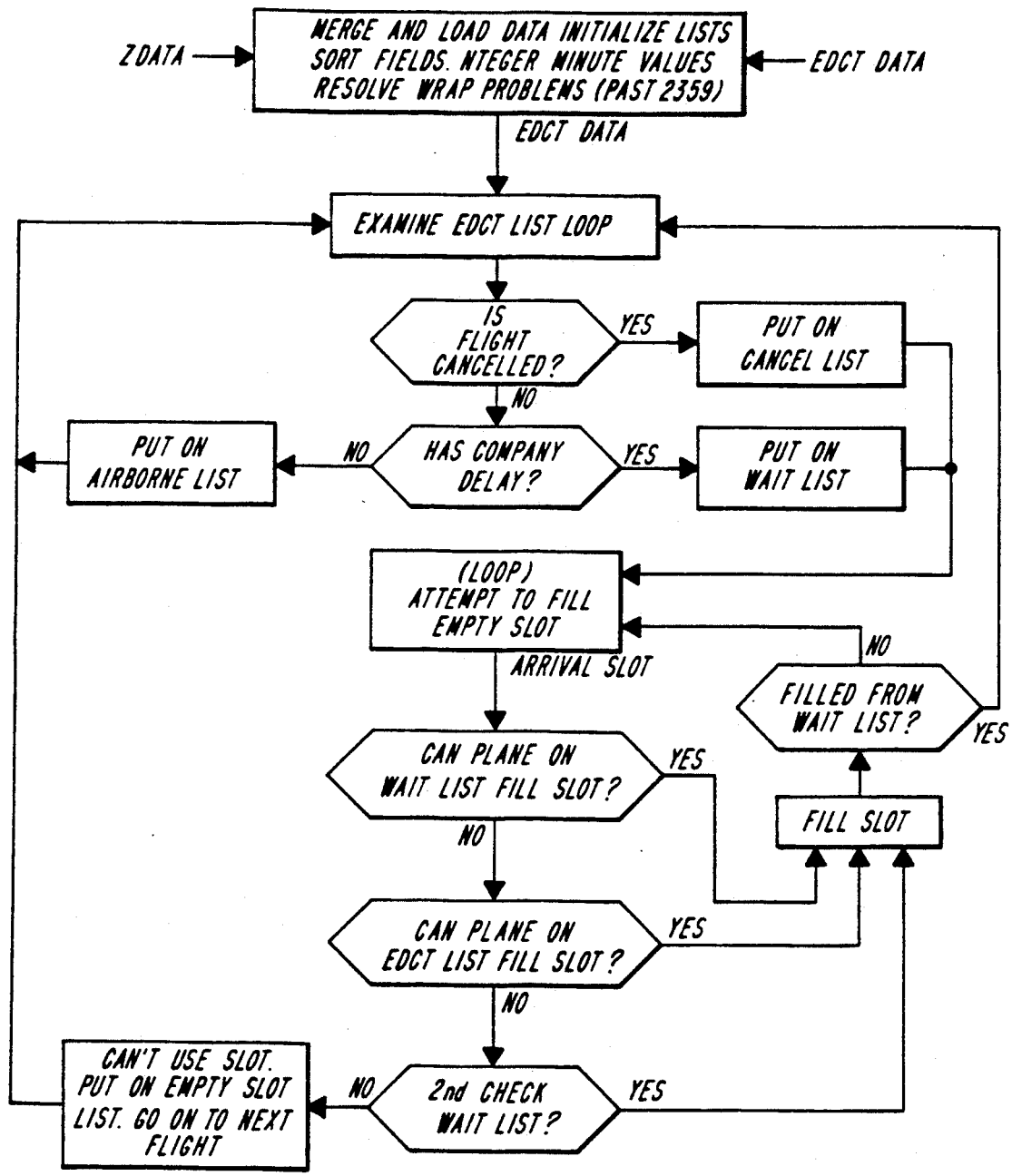
FIG. 6 is a flow chart of one embodiment of logic for reassigning a vacant slot to another flight in a fast-time simulation.

Several methods of assigning a vacant slot to other flights were examined with the fast-time simulation, and the following logic seemed to yield the best performance and also treated all flights reasonably equitably. The logic is shown in FIG. 6. When a slot is vacant, the flights in the waitlist are checked to see if any can use that slot. They are checked in the same sequence as they were put in the waitlist; that is, the flight with the earliest original EDCT has the highest priority. As mentioned earlier, since a flight in the waitlist is considered to have taken no ATC delay when it was moved into the waitlist, its earliest permissible departure time is taken to be the time it was ready to leave (that is, the DZ message time from the actual data) delayed by the original ATC ground delay it was assigned. If one is found, the slot is assigned to that flight. It is moved back into the EDCT list and removed from the waitlist. The simulation will go to the next event. If none is found, the flights in the EDCT list with arrival times later than the vacant slot are checked. These are checked in descending priority with increasing (that is, later) EDCT time. If one if found, the flight is assigned a new EDCT corresponding to that arrival slot. The arrival slot vacated by this flight is then filled by the same sequence of tests. If no flight in the EDCT list can fill a vacant slot, then the flights in the waitlist are tested again, but this time with no ATC ground delay; that is, the earliest permissible time is the time the flight can leave, which is the time of the DZ message. Thus, no arrival slot is left unused if there is a flight than can use it, with or without ATC delay.

Figure 7:
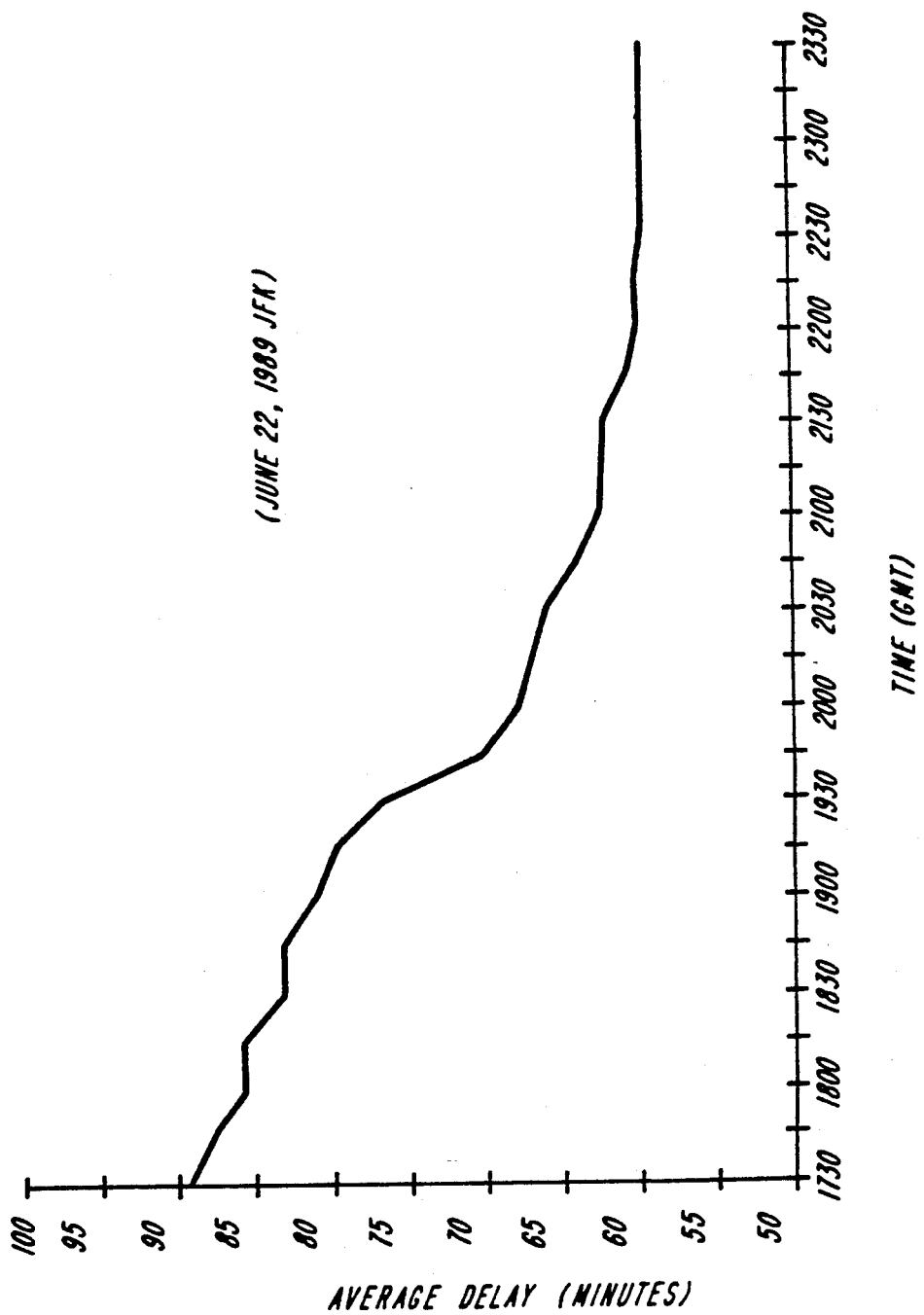
FIG. 7 shows the average delay as a function of time for the fast-time simulation.
Figure 8A:
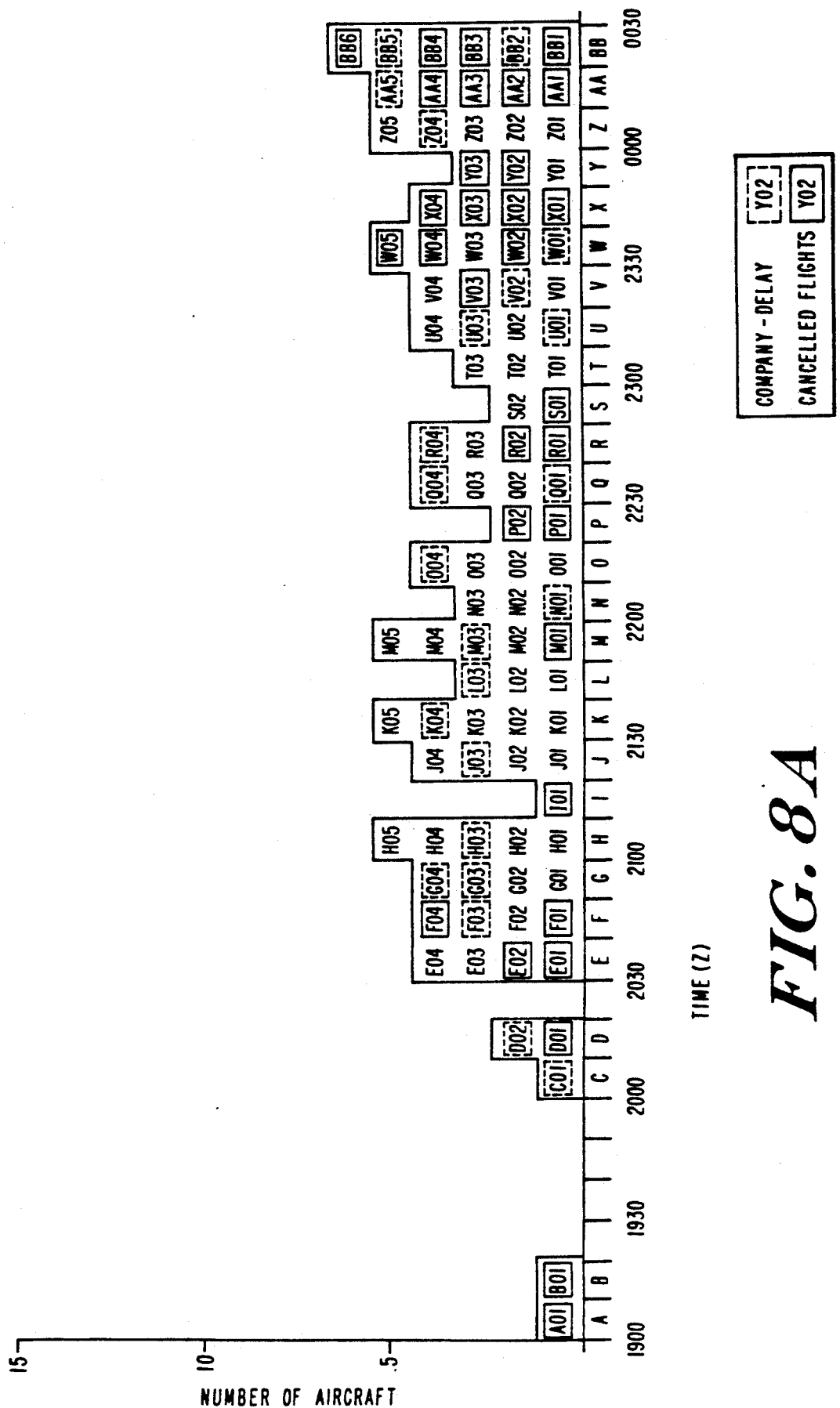
FIG. 8a shows the arrivals planned by CFC for Jun. 22, 1989 at JFK airport.

The above logic was implemented in the fast-time simulation and all the twenty-two cases were evaluated. The results are shown in Table 3. The ground delays assigned to the aircraft, as extracted from the EDCT lists received from CFC, are compared against the issued delays with adaptive logic. The comparison is meaningful only for those flights which were not cancelled or delayed due to other causes. The ground delays were reduced by 13 to 70 percent with the adaptive logic. The savings depend on a number of factor, particularly cancellations and how early in time the cancellations occur. If cancellations occur late, it is more difficult to reassign the slots and reap significant benefits. An example of the trend of the average delay is shown as a function of time in FIG. 7 for J. F. K. Airport at New York on Jun. 22, 1989. FIG. 8a shows the arrivals planned by CFC for the same case as a function of time. The figure shows only those flights subject to the CFC ground delay; that is, flights on the EDCT list received from CFC. By examining the z-messages for that day, the flights that were cancelled or had company delay were identified and are shown in the figure. These flights along with the flights that did not receive ground delays would generally match the capacity of the airport specified by the CFC specialist. FIG. 8b shows the actual arrivals which reflect the variations in the estimated flight time en route, ATC actions etc. as well as the cancellations and company delays. It is evident that the anticipated airport capacity was not utilized as planned and therefore the efficiency of capacity utilization was very low.

Figure 8C:
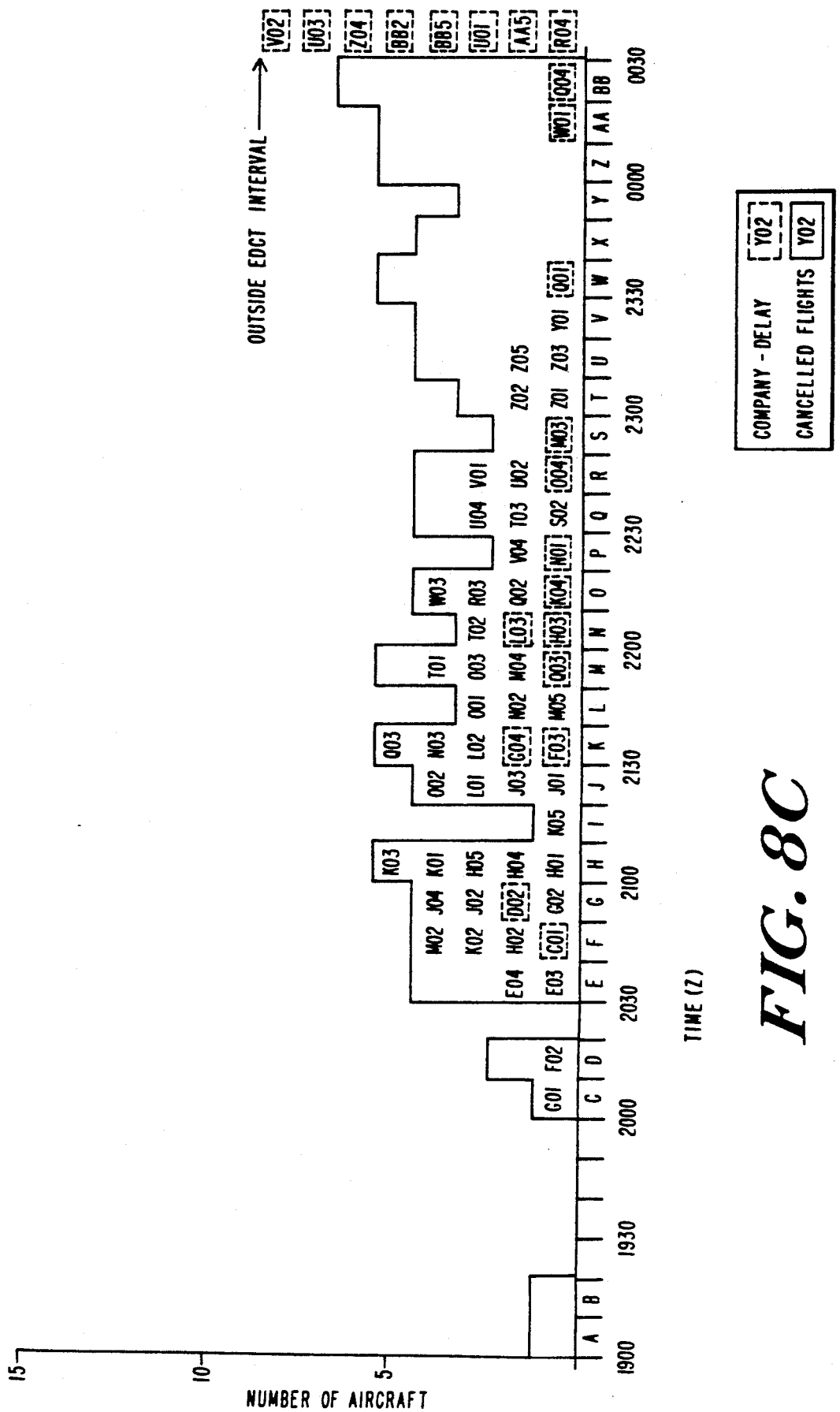
FIG. 8c shows the arrivals when the adaptive ground delay assignment method of the present invention is used in the fast-time simulation.

FIG. 8c shows the effect of reassignment of the arrival slots vacated by the cancellations and company delayed flights. Of course, it was not possible to estimate what the actual arrival times and capacity utilization would have been with the adaptive logic. But, clearly, the assigned ground delays can be considerably reduced, as shown in Table 3, by much better utilization of the airport capacity using the adaptive logic.

The algorithm implemented in the fast-time simulation, as explained earlier, is based on a number of simplifying assumptions. In the real world, a number of variabilities in the information available to ATC have to be accommodated. For example, it is probably not very practical to reassign the EDCT to a flight that has only 15 minutes until take-off. The aircraft may be already taxiing to the end of the runway and it is not practical to advance the take-off by just a few minutes.

It is recognized that modifications and variations of the present invention will occur to those skilled in the art, and it is intended that all such modifications and variations be included within the scope of the claims.

What is claimed is:

1. A system for issuing adaptive ground delays to air traffic comprising:
a flow control facility computing apparatus which issues ground delays;
a database of real time flight status information;
apparatus for communicating said flight status information to said computing apparatus; and
means for automatically updating and reissuing ground delays and reallocating arrival slots as a function of said real time flight status information;
wherein the computing apparatus reassigns arrival slots which become vacant according the following steps:
searching a waitlist of flights that have been assigned ground delay, according to earliest EDCT (with ground delay added), for a candidate eligible to fill a vacant arrival slot;
assigning an eligible candidate to said vacant slot, thereby creating another vacant arrival slot; and
continuing until no eligible candidates are found on said waitlist.

TABLE 3

| | Total Number of Flights | Cancelled Flights | Non Company-Delay Flights | | | | | ATC Delay for Company-Delay Flights (min) |
| --- | --- | --- | --- | --- | --- | --- | --- | --- |
| | | | Company-Delay Flights | Original EDCT Ground Delay (min) | Adaptive Ground Delay (Min) | Difference in Delay (min) | Delay Reduction | |
| March 4 | | | | | | | | |
| CLT | 82 | 7 | 22 | 21.91 | 18.70 | 3.21 | 15% | 8.81 |
| ORD | 786 | 243 | 324 | 22.70 | 13.16 | 9.54 | 42% | 4.36 |
| MDW | 72 | 40 | 32 | * | * | * | * | 3.60 |
| STL | 308 | 30 | 102 | 28.53 | 18.85 | 9.68 | 34% | 11.17 |
| JFK | 81 | 20 | 21 | 38.28 | 17.30 | 20.97 | 55% | 4.31 |
| SFO | 145 | 13 | 31 | 35.40 | 25.15 | 10.24 | 29% | 13.32 |
| April 17 | | | | | | | | |
| SFO | 304 | 33 | 17 | 93.86 | 57.04 | 36.82 | 39% | 24.31 |
| DEN | 214 | 4 | 24 | 50.97 | 44.49 | 6.49 | 13% | 51.25 |
| June 22 | | | | | | | | |
| EWR | 454 | 198 | 118 | 77.74 | 30.60 | 47.14 | 61% | 19.63 |
| LGA | 256 | 65 | 101 | 65.70 | 47.18 | 18.51 | 28% | 27.36 |
| CLT | 195 | 31 | 84 | 33.80 | 18.42 | 15.38 | 46% | 12.62 |
| PHL | 89 | 26 | 47 | 21.68 | 9.75 | 11.94 | 55% | 9.39 |
| JFK | 98 | 32 | 21 | 89.31 | 59.59 | 29.73 | 33% | 6.38 |
| August 4 | | | | | | | | |
| SFO | 55 | 4 | 11 | 25.60 | 18.39 | 7.21 | 28% | 17.80 |
| PHL | 211 | 25 | 115 | 22.81 | 14.34 | 8.46 | 37% | 8.07 |
| EWR | 204 | 25 | 67 | 60.97 | 31.35 | 29.62 | 49% | 8.81 |
| ORD | 764 | 73 | 335 | 27.84 | 18.72 | 9.12 | 33% | 32.52 |
| MDW | 90 | 8 | 35 | 21.58 | 14.69 | 6.89 | 32% | 9.69 |
| BOS | 220 | 31 | 90 | 49.56 | 15.77 | 33.79 | 68% | 6.68 |
| JFK | 167 | 27 | 54 | 45.90 | 13.95 | 31.95 | 70% | 5.94 |
| LGA | 201 | 20 | 88 | 33.39 | 11.09 | 22.30 | 67% | 6.72 |
| PIT | 58 | 3 | 12 | 51.81 | 42.81 | 9.00 | 17% | 23.38 |

2. The system wherein the computing apparatus reassigns arrival slots which are still vacant according to the following steps:

searching a list of Expected Departure Clearance Times, or EDCTs, according to latest EDCT, for flights with arrival times later than a vacant arrival slot, for a candidate eligible to fill said vacant slot;

assigning an eligible candidate to said vacant slot, thereby creating another vacant slot; and continuing until no eligible candidates are found on said EDCT list.

3. The system of claim 2 wherein the computing apparatus reassigns arrival slots which are still vacant according to the following steps:

searching the waitlist again according to earliest original EDCT (minus added ground delay) for a candidate elgible to fill a vacant arrival slot;

assigning an eligible candidate to said vacant slot, thereby creating another vacant slot; and continuing until no eligible candidates are found on the EDCT list, whereby no arrival slot is left unused if there is a flight that can use it.

4. A system for issuing adaptive ground delays to air traffic comprising:

a flow control facility computing apparatus which issues ground delays;

a database a real time flight status information;

apparatus for communicating said flight status information to said computing apparatus; and means for automatically updating and reissuing ground delays and reallocating arrival slots as a function of said real time flight status information;

wherein the computing apparatus reassigns flight arrival slots (Atimes) for flights with assigned EDCTs (Ctimes), and proposed times of departure (Ptimes) according to the following steps:

monitoring messages from flight operators on cancellations and company delays and monitoring departure messages from air traffic control centers for flights that do not or will not leave within a specified interval from their EDCTs in order to find flights which will not meet their arrival slots, thereby leaving their arrival slots vacant;

reassigning any vacant arrival slots to other flights, thereby creating new vacant arrival slots; and continuing until no further flight can be moved into an earlier slot.

5. The system of claim 4 wherein a flight is not reassigned if it has departed, or if its Atime or Ctime is within predetermined intervals of the current time.

6. The system of claim 4 wherein priority for flight reassignment is according to increasing Ctime.

7. The system of claim 4 wherein a flight is not reassigned a new Atime if its corresponding new Ctime would be before its Ptime or the current time.

8. The system of claim 4 further comprising placing each flight which does not meet its Ctime on a wait list until it calls for pushback, and when it calls for pushback, assigning it a new Atime.

* * * * *

UNITED STATES PATENT AND TRADEMARK OFFICE
CERTIFICATE OF CORRECTION

PATENT NO.  : 5,265,023
DATED       : Nov. 23, 1993
INVENTOR(S) : Balraj G. Sokkappa It is certified that error appears in the above-indentified patent and that said Letters Patent is hereby corrected as shown below:

Column 3, line 42: please delete "capacity" and insert therefor -- capacity1 --;

Column 8, line 61: after "one" and before "found" please delete "if" and insert therefor -- is --; and Column 11, line 1: after "system" and before "wherein" please insert -- of claim 1 --.

Signed and Sealed this

Twenty-fourth Day of May, 1994

Attest:

BRUCE LEHMAN

*Attesting Officer*    *Commissioner of Patents and Trademarks*